(12) United States Patent
Müller et al.

(10) Patent No.: US 11,068,678 B2
(45) Date of Patent: Jul. 20, 2021

(54) OPTOELECTRONIC SENSOR AND METHOD OF A REPEATED OPTICAL DETECTION OF OBJECTS AT DIFFERENT OBJECT DISTANCES

(71) Applicant: SICK AG, Waldkirch (DE)

(72) Inventors: Romain Müller, Waldkirch (DE); Florian Schneider, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 16/458,723

(22) Filed: Jul. 1, 2019

(65) Prior Publication Data

US 2020/0005006 A1    Jan. 2, 2020

(30) Foreign Application Priority Data

Jul. 2, 2018 (EP) ..................................... 18181130

(51) Int. Cl.
*G06K 7/10* (2006.01)
*G06K 7/14* (2006.01)

(52) U.S. Cl.
CPC ..... *G06K 7/10851* (2013.01); *G06K 7/10792* (2013.01); *G06K 7/146* (2013.01)

(58) Field of Classification Search
CPC . G06K 7/10851; G06K 7/10792; G06K 7/146
USPC ........................................................ 235/454
See application file for complete search history.

(56) References Cited

U.S. PATENT DOCUMENTS

| 6,830,189 | B2 * | 12/2004 | Tsikos | ................ | G06K 17/0022 235/462.22 |
| 6,889,903 | B1 * | 5/2005 | Koenck | .............. | G06K 7/10633 235/462.01 |
| 2008/0245872 | A1 * | 10/2008 | Good | ................. | G06K 7/10811 235/462.24 |
| 2012/0181338 | A1 * | 7/2012 | Gao | ......................... | G06K 7/12 235/455 |

(Continued)

FOREIGN PATENT DOCUMENTS

| EP | 1014292 B1 | 5/2003 |
| EP | 0789315 B1 | 5/2006 |
| EP | 2003599 A1 | 12/2008 |

(Continued)

OTHER PUBLICATIONS

European Search Report dated Jan. 11, 2019 issued in corresponding European Application No. 18181130.8.

*Primary Examiner* — Michael G Lee
*Assistant Examiner* — David Tardif
(74) *Attorney, Agent, or Firm* — Nath, Goldberg and Meyer; Jerald L. Meyer

(57) ABSTRACT

An optoelectronic sensor is provided for a repeated detection of objects at different object distances, having a light receiver for generating a received signal from received light, having an evaluation unit for generating object information from the received signal, and having a distance sensor for determining the object distance from a respective object. The evaluation unit is here configured to acquire a measurement variable from the received signal with respect to an object, to associate the measurement variable with the object distance measured for the object, and to form a first distribution of the measurement variable via the object distance after detecting a plurality of objects.

17 Claims, 4 Drawing Sheets

(56) References Cited

U.S. PATENT DOCUMENTS

Figure 1:
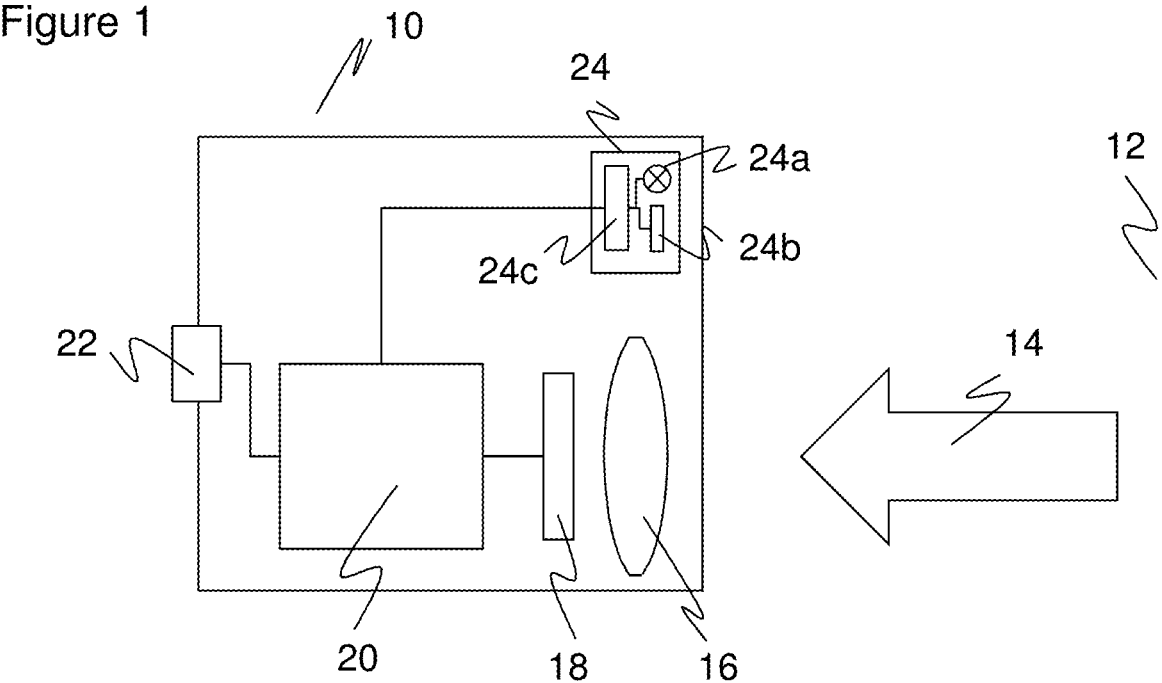

2013/0020391 A1* 1/2013 Olmstead ............ G06K 7/10762
235/438

FOREIGN PATENT DOCUMENTS

| EP | 2693362 A1 | 2/2014 |
|----|------------|--------|
| WO | 2018/028795 A1 | 2/2018 |

* cited by examiner

OPTOELECTRONIC SENSOR AND METHOD OF A REPEATED OPTICAL DETECTION OF OBJECTS AT DIFFERENT OBJECT DISTANCES

The invention relates to an optoelectronic sensor, in particular a camera, for a repeated detection of objects at different object distances, having a light receiver for generating a received signal from received light, having an evaluation unit for generating object information from the received signal, and having a distance sensor for determining the object distance from a respective object. The invention further relates to a method of a repeated optical detecting of objects at different object distances.

Cameras are used in a variety of ways in industrial applications to automatically detect object properties, for example for the inspection or for the measurement of objects. In this respect, images of the object are recorded and are evaluated in accordance with the task by image processing methods. A further use of cameras is the reading of codes. Objects with the codes located thereon are recorded with the aid of an image sensor and the code regions located therein are identified in the images and then decoded. Camera-based code readers also cope without problem with different code types than one-dimensional barcodes which also have a two-dimensional structure like a matrix code and provide more information. The automatic detection of the text of printed addresses, (optical character recognition, OCR) or of handwriting is also a reading of codes in principle. Typical areas of use of code readers are supermarket cash registers, automatic parcel identification, sorting of mail shipments, baggage handling at airports, and other logistic applications. In this respect, the barcode scanners already known for a longer period are still in widespread use in addition to the camera-based code readers.

A frequent detection situation is the installation of the camera above a conveyor belt. The camera records images during the relative movement of the object stream on the conveyor belt and initiates further processing steps in dependence on the object properties acquired. Such processing steps comprise, for example, the further processing adapted to the specific object at a machine which acts on the conveyed objects or a change to the object stream in that specific objects are expelled from the object stream within the framework of a quality control or the object stream is sorted into a plurality of partial object streams. Especially with code readers, the objects are identified with reference to the applied codes for a correct sorting or similar processing steps.

The camera is installed and aligned at a suitable position to be put into operation, for which purpose it frequently also provide aids such as projected target patterns and the like. It is then assumed as a rule that the camera is ideally installed and the status of the camera with respect to the environment does not change over a certain operating time. This assumption is, however, not always justified. Conventional cameras and barcode scanners also have practically no intelligence of their own to utilize the optimization potential that is thereby present.

There are conventional cameras that have their own distance sensors that determine distances from an object using a time of flight process to readjust the focal adjustment. This distance measurement is also used to trigger a recording if an object is located at a specific distance. This is, however, only a direct reaction to the currently measured distance.

EP 0 789 315 B1 discloses a code reader having a regulation for its decoding behavior to find and maintain an ideal compromise between reading capability and reliability. This also relates to parameters of the decoder and not to the actual optical detection whose changes are accepted as an external influence and which the regulation attempts to compensate. Nor are any object distances measured or other additional optical information acquired to improve the regulation.

A method of operating an optical code reading system is presented in EP 1 014 292 B1 in which parameters of the reading process and thus a suitable working point are automatically readjusted. However, only the recorded images themselves are analyzed for this purpose; additional information such as a distance determination do not enter into this analysis.

It is therefore the object of the invention to adapt the optical detection of object information, specifically the reading of codes, better to the application situation.

This object is satisfied by an optoelectronic sensor and by a method of a repeated optical detecting of objects at different object distances in accordance with the respective independent claim. A light receiver detects received light from the objects and generates a received signal from it. In the case of an image sensor as the light receiver, preferably image data. An evaluation unit acquires at least one piece of object information from the received signal. In addition, the respective object distance is measured. A separate distance sensor is preferably used for this purpose that is in particular based on a time of flight (TOF) process and that works in parallel with or in the background of the actual measurement of the object information. It is conceivable that the light receiver or its received signal is involved in or carries out this distance measurement. However, the measurement of the object distance is then also an additional evaluation and/or measurement and the object distance is a further piece of information in addition to the object information.

The invention starts from the basic idea of monitoring the status of the sensor by means of the distance measurement and of making statistical statements on whether there is any optimization potential or a servicing requirement. This monitoring takes place in parallel with the actual operation in which the object information is generated. A measurement variable is acquired from the received signal and is associated with the object distance, with it being ensured, for example, by time proximity that the measurement variable and the object distance belong to the same object. The measurement variable is as a rule not the object information, but rather an auxiliary value, for example a value such as the contrast, exposure, or an evaluation of success that characterizes the detection of the actual object information. After the detection of a plurality of objects and a respective association of the measurement variable with its object distance, a first distribution of the measurement variable over the object distance is formed that enables the desired statistical statements. The distribution always relates to a specific time period and thus to a plurality of detected objects. The selection of this plurality should be such that sufficient statistics are available, but at the same time the respective time period is short enough to respond to external changes after an appropriate conversion time that can be in the range of seconds, minutes, or hours depending on the application.

The invention has the advantage that the status of the sensor and of the environment is detected by means of the distance measurement and statistical statements acquired from the first distribution. The sensor thus has its own intelligence and can independently recognize disruptions, present optimization proposals, or immediately itself install suitable parameters or signal a servicing requirement.

The sensor is preferably arranged in a stationary manner at an object stream, for instance on a conveyor belt. When installed in a bird's eye view, the respective measured object distance corresponds to an object height by a difference formation with the known installation height. It is therefore used synonymously with the object distance at some passages without thereby implying a restriction to this specific arrangement.

The evaluation unit is preferably configured to form a second distribution of the object distances. A second distribution as a frequency distribution of the object distances themselves is therefore also formed in addition to the first distribution in which a distribution of the measurement variable over the object distances is generated by means of the object distances. More statistical information is thereby available to monitor and to optimize the status of the sensor.

The evaluation unit is preferably configured to form a distribution of the object distances as the first distribution and to form a distribution of the object distances in another time period as the second distribution. The object distance is exceptionally itself the measurement variable in this embodiment. The object distance is, however, still determined in addition to the actually sought object information. Since frequency distributions of the object distance are determined from different time periods, changes of the adjustment and of the installation due to wanted or unwanted manipulations such as a blow against the sensor can in particular be recognized.

The evaluation unit is preferably configured to compare the first distribution and the second distribution and then to carry out or propose changes to the sensor to improve the coincidence of the distributions. The sensor should in particular be aligned or set such that it is aligned respectively set for the most frequently actually occurring object distances for good results with respect to the object property to be determined. For this purpose, the two distributions are preferably brought into a coincidence that is as large as possible by changing properties of the sensor that affect the measurement variable. A conceivable partial step is to multiply the two distributions by one another. This product of the distributions should correspond as much as possible to the second distribution of the object distances that actually occurred and thus will also probably occur in the future. Such an adaptation on the basis of the comparison of distributions is sluggish with respect to a real time readjustment with reference to the measured object distance during the detection of the received signal and is thus above all suitable for the case that a highly dynamic adaptation within the detection of an object is not possible.

The change is preferably an optical readjustment. When and preferably how the optical settings can be improved is thus recognized. This relates, on the one hand, to settings of a reception optics of the sensor, in particular of its focal position. It is, however, also conceivable that the total sensor has to be readjusted, for example because it has moved from its original adjustment due to vibrations or due to a blow. The adaptation of the focal position also permits an illustrative example to explain the sensors for which a comparison of distributions is sensible, namely in particular with a fixed focus device where the requirement for a change of the fixed focal position is recognized. The ascertainment of a large number of data points to statistically arrive at this recognition would be less sensible if the sensor already has a fast autofocus with respect to the actual object distance.

The change is preferably an adaptation of the illumination intensity. It is thus prevented, where possible, that objects are detected in an underexposed or overexposed manner. What is meant here is an effective illumination intensity that can, for example, be influenced by the output power of an illumination light source, by switching light sources on and off, by amplifying the received signal, or by an illumination time.

The evaluation unit is preferably configured to form a probability distribution as the first distribution in that it determines a respective probability as the measurement variable that a value derived from the received signal is in a fixed range. Which absolute values a measurement variable adopts is frequently not relevant to an optimization of sensor settings, but rather whether said measurement variable moves within a specified value range or not. This can be detected particularly simply by a probability distribution. The fixed range can also be binary, i.e. a probability can be determined whether a binary value is at one or not.

The evaluation unit is preferably configured to associate the measurement variable from the first distribution at this object distance as an expected measurement variable with an object with reference to the object distance measured for the object. This is a kind of reversal of the previous procedure. The measurement variable and an associated object distance were previously respectively detected to thus localize a data point of the first distribution. The first distribution is now conversely utilized to assume the measurement variable in accordance with the first distribution with a currently measured object distance, that is to make an assumption for the measurement variable of the currently detected object with reference to the first distribution. It is therefore assumed that the currently detected object behaves with respect to the measurement variable as statistically the objects previously detected with this object distance. The association can still be found to be incorrect in the further course, i.e. this specific object does not behave in accordance with the first distribution or the possibility of a deviation in an individual case is implemented that is inherent in a statistic and a probability.

The evaluation unit is preferably configured to compare the expected measurement variable with the measurement variable actually determined for the object from the received signal. If a significant deviation by more than a tolerance results in this process, a conceivable conclusion is that the sensor is not ideally set. A different advantageous conclusion, however, relates to the object itself that does not satisfy an expected quality criterion, above all when a high probability had previously been determined for the measurement variable with the measured object distance in accordance with the first distribution and is very different only with this individual object. An example for a quality criterion that has not been satisfied is a poorly printed or damaged code. The sensor can output a warning in this respect or can store the information. A piece of information that the code is presumably impaired is then specifically added to the code content in the example of an optical code.

The measurement variable is preferably a measure of contrast. It covers various possibilities known per se to evaluate the contrast. A focal position or an adjustment of the optics or of the sensor itself is thus evaluated. As with almost all the measurement variables, the measure of contrast can be directly evaluated or the probability whether the measure of contrast is within a specified value range or not is determined.

The measurement variable is preferably a measure of intensity. This term must also initially be given a broad interpretation; it is a measure to determine an appropriate exposure without underexposure or overexposure. In particular the gray values of an image, the minimal or maximum gray value, the mean gray value, and the like are in particular suitable for this purpose. The measure of intensity can also be evaluated directly or via a probability whether it is within a specified value range.

The sensor is preferably a code reader whose evaluation unit is configured to read a piece of code information of an optical code from the received signal. It can be a barcode scanner that has a light transmitter for transmitting a reading beam and a movable deflection unit to periodically deflect the reading beam in the detection zone. A time-dependent received signal whose amplitude images the bright/dark distances of the barcode in accordance with the respective scan angle results from this scan. Alternatively, the code reader is camera-based. Code readers and the detection range are in relative movement in a large number of applications, for instance when a hand-held device is swept over the detection zone or when the code reader is installed on a conveyor belt to read codes on objects conveyed thereon. Such relative movements provide that an object and a code region are successively detected line-wise so that not only image lines, but also two-dimensional images are created. This applies equally to code scanners and to a line scan camera in a camera based code reader. Two-dimensional image sensors are equally conceivable that directly or indirectly record a large image section.

The measurement variable is preferably an evaluation of success for the reading of a code. This is preferably a binary measurement variable that is also called a success (Good read) and a reading error (No read) for an individual reading procedure. The reading rate, that is ultimately the quotient from the number of Good reads and the number of totally detected codes, is an evaluation of success and further measures are conceivable.

The measurement variable preferably has a code property. The magnitude of the total code, its module size, the position of the code, and the kind of code count as code properties.

The method in accordance with the invention can be further developed in a similar manner and shows similar advantages in so doing. Such advantageous features are described in an exemplary, but not exclusive manner in the subordinate claims dependent on the independent claims.

Figure 2:
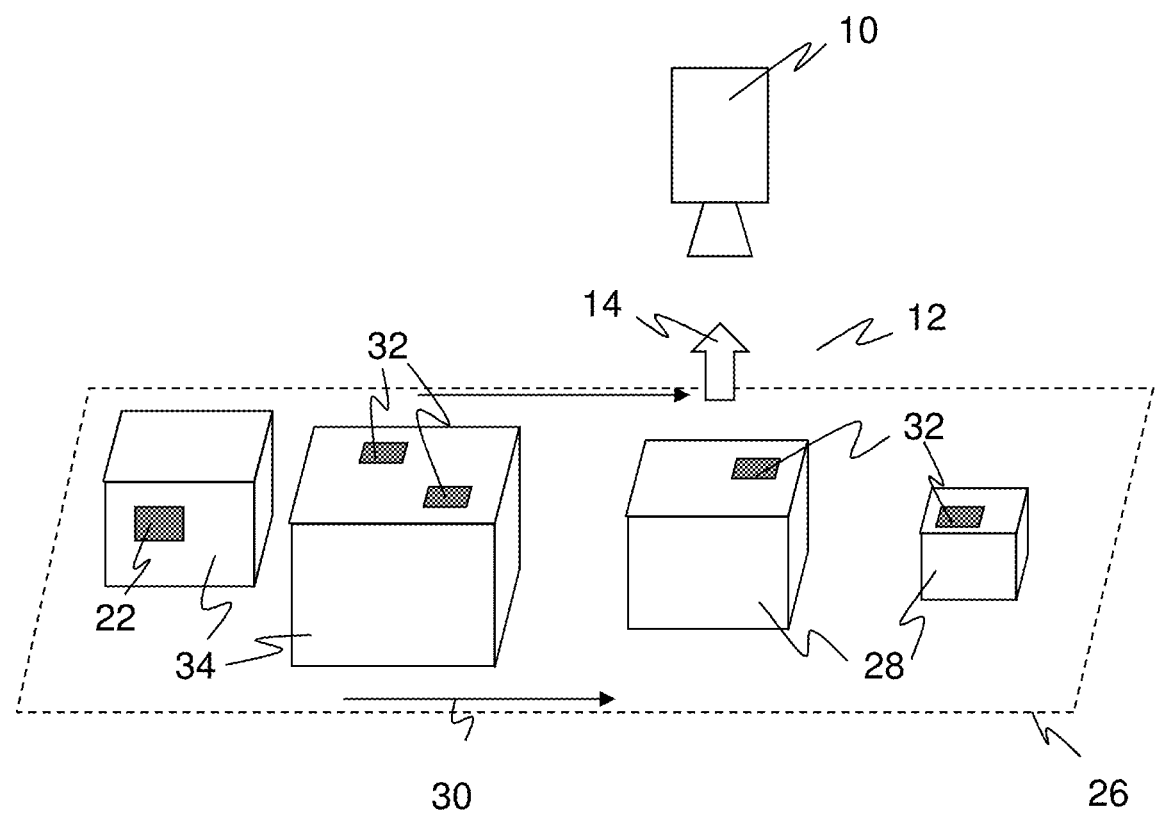
Figure 3:
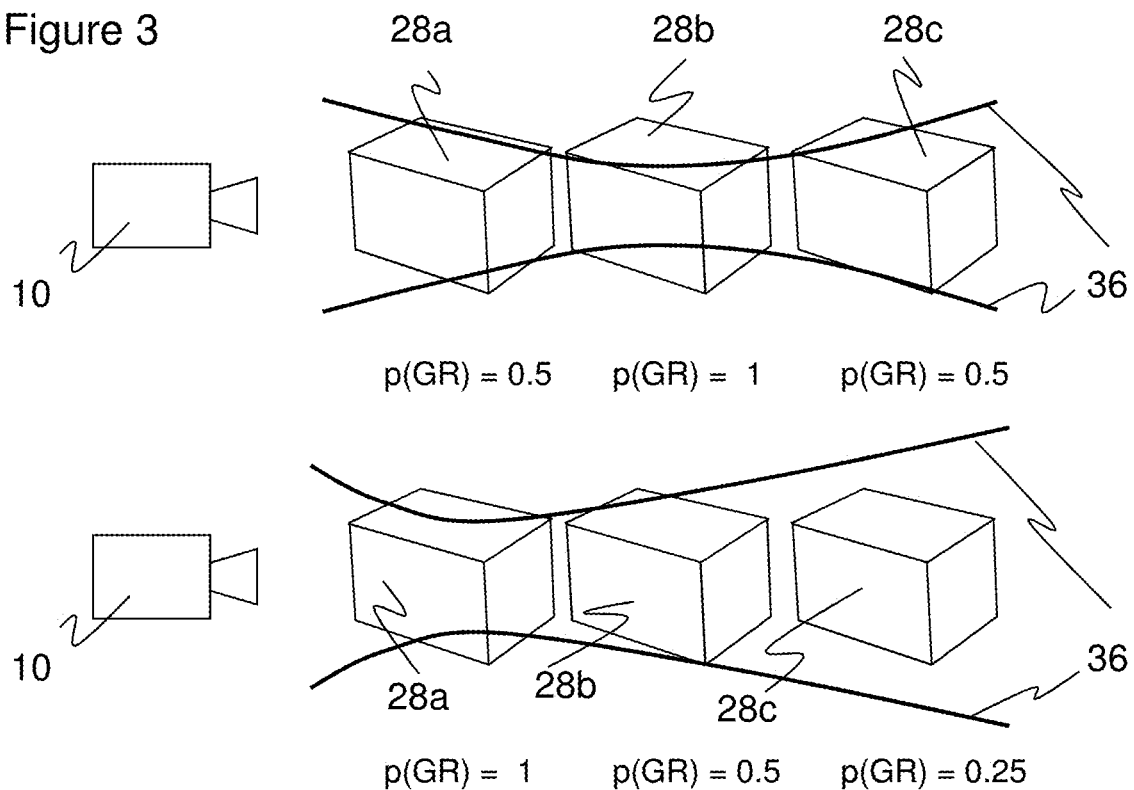
Figure 4:
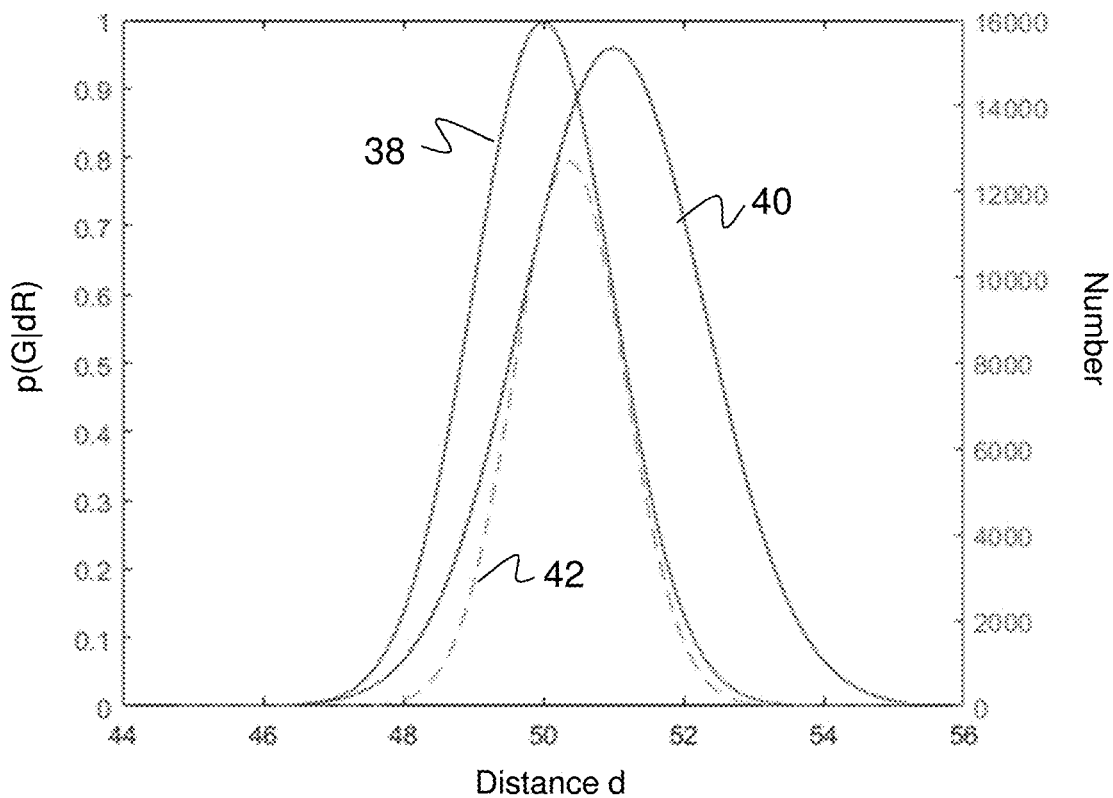
Figure 5:
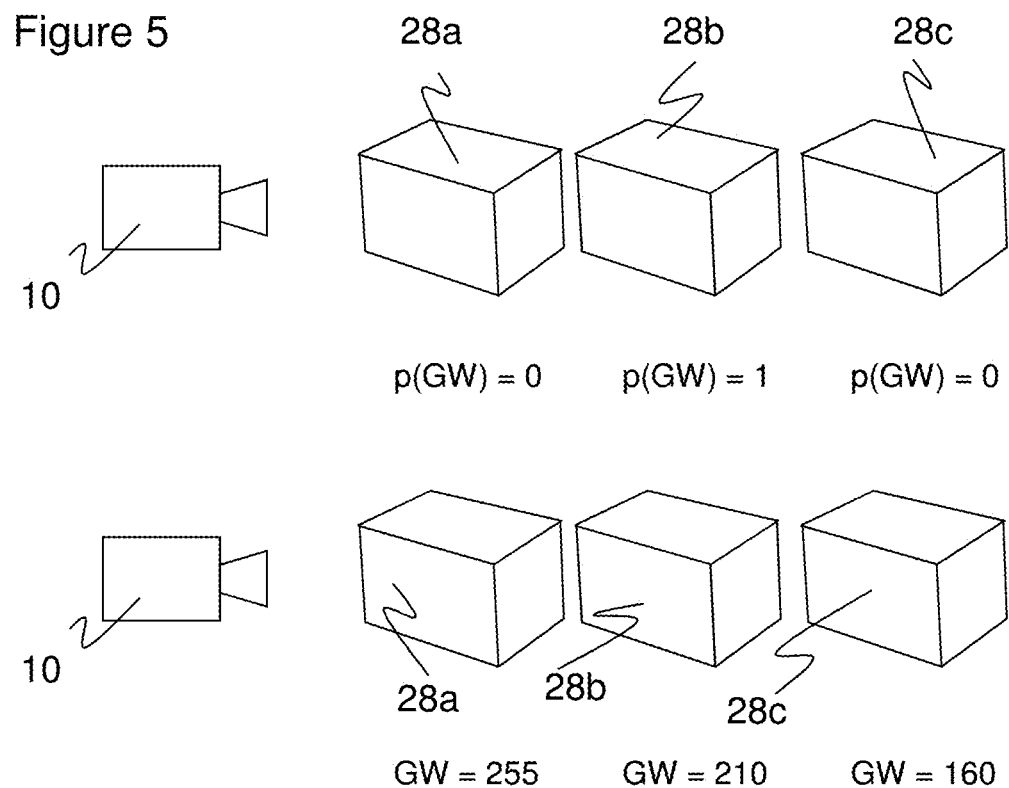
Figure 6:
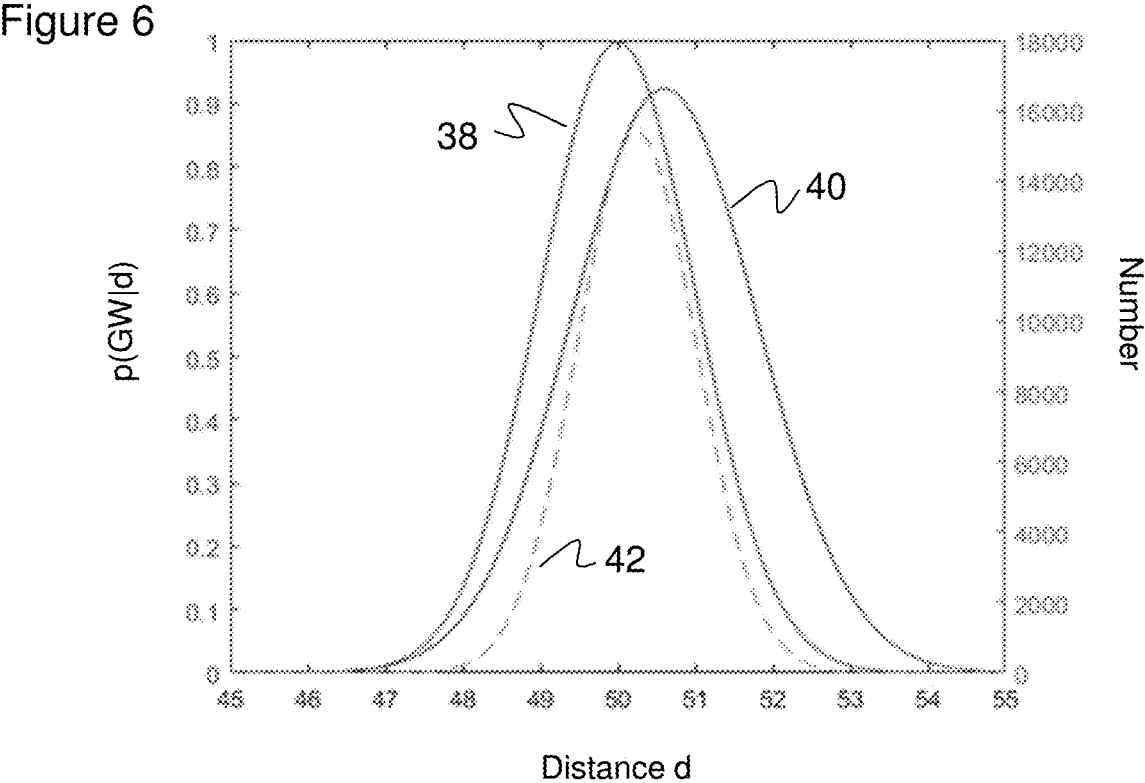
Figure 7:
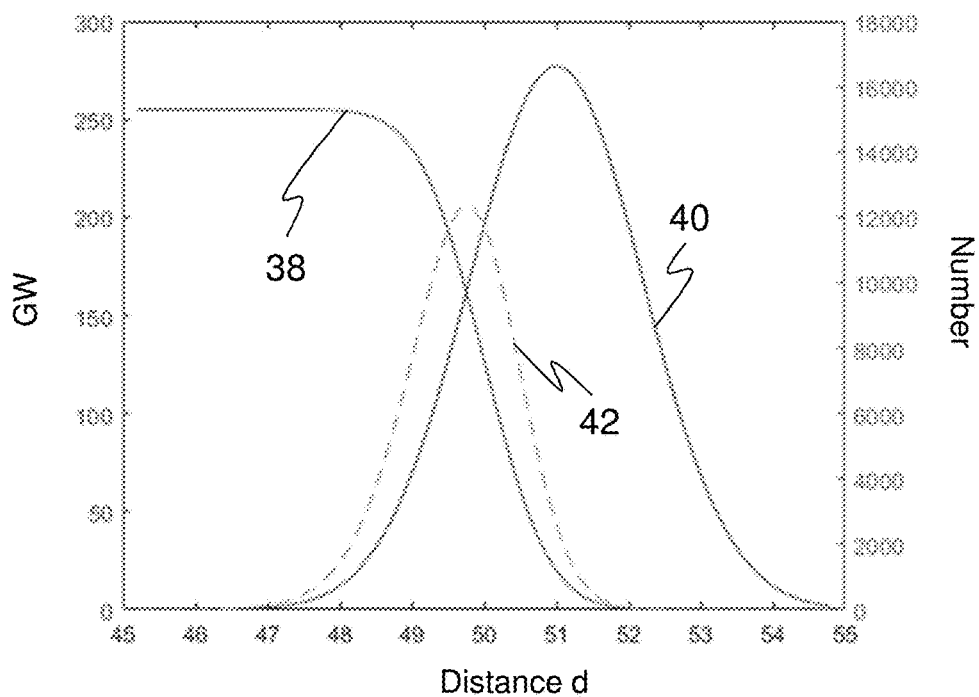
Figure 8:
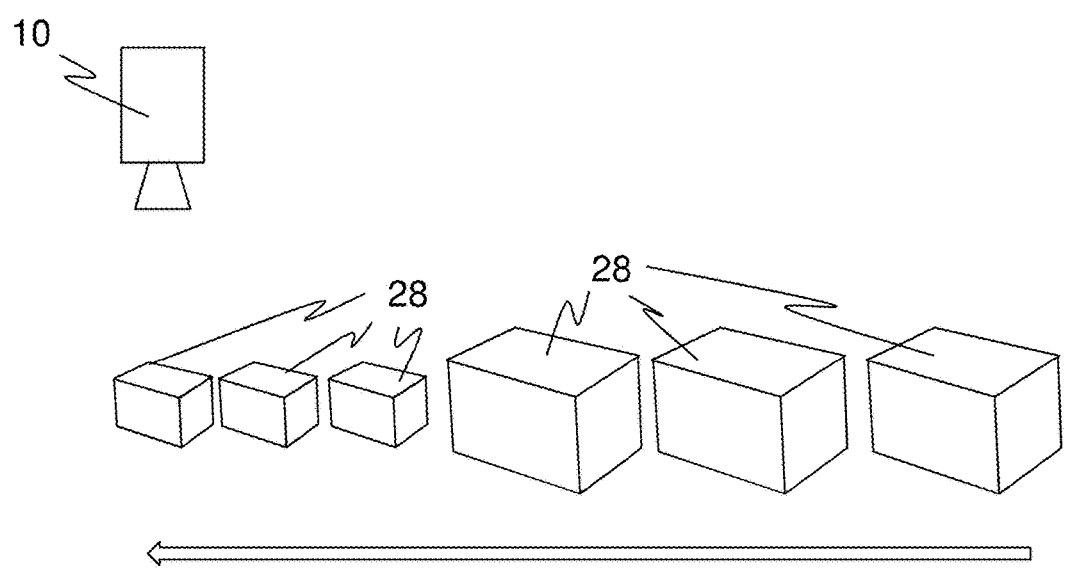

The invention will be explained in more detail in the following also with respect to further features and advantages by way of example with reference to embodiments and to the enclosed drawing. The Figures of the drawing show in:

FIG. 1 a schematic representation of an optoelectronic sensor for generating object information having an additional distance measurement;

FIG. 2 a schematic three-dimensional overview representation of the exemplary installation of an optoelectronic sensor above a conveyor belt on which objects are conveyed;

FIG. 3 a schematic representation of objects at different distances to explain a conditional? probability that a code can be successfully read at a specific object distance;

FIG. 4 an exemplary representation of a probability distribution that codes are successfully read at a respective object distance, of a frequency distribution of the object distances themselves, and of the product of both distributions;

FIG. 5 a schematic representation of objects at different distances for explaining the monitoring of intensity conditions;

FIG. 6 an exemplary representation similar to FIG. 4 of a probability distribution that intensity conditions at a respective object distance remain in a specified region, of a frequency distribution of the object distances themselves, and of the product of both distributions;

FIG. 7 an exemplary representation of a modification of FIG. 6 in which the probability distribution has been replaced by a distance-dependent distribution of gray values; and FIG. 8 a schematic representation of a recording situation in which objects having specific heights and consequently object distances repeat.

FIG. 1 shows a schematic representation of an optoelectronic sensor 10. Received light 14 from a detection zone 12 is received through a reception optics 16 by a light receiver 18 and a corresponding received signal is generated there. The received signal is evaluated in an evaluation unit 20 to acquire object information of an object in the detection zone 12. This object information, but also other information such as image data, auxiliary values, parameters, and the like are exchanged via an interface 22 with an external device, for example a higher ranking control, not shown.

A distance sensor 24 is provided in addition to the actual detection system having the light receiver 18. In this embodiment it is an autonomous, compact time of flight sensor having a light source 24a, a second light receiver 24b, and a distance measuring unit 24c. In a pulse-based time of light process, the light source 24a transmits light pulses that are received again by the second light receiver 24b after reflection at the object in the detection zone 12 and the distance measuring unit 24c determines the time of flight between the transmission and the reception of the light pulse. Alternatively, in a phase process, an amplitude modulated light signal is transmitted and its phase shift on reception is determined. In other embodiments, the light receiver 18 and the evaluation unit 20 also take over the distance measurement or assist it in addition to the acquisition of object information, in particular in that the light receiver 18 also acts as a second light receiver 24b or in that the evaluation unit 20 also takes over the time of flight evaluation of the distance measuring unit 24c.

The sensor 10 is preferably a camera in which the light receiver 18 is configured as a linear or a matrix-like image sensor. The camera is in particular configured as a code reader in that the evaluation unit 20 is able to identify a code region in the recorded images and to read the information encoded there. However, a barcode scanner is also a possible embodiment of the sensor 10 instead of such a camera based code reader. Other, non-exclusive examples for the sensor 10 are switching systems such as background-masking sensors that react to objects having specific properties as well as color sensors or contrast sensors. In addition, further elements of the sensor 10 are possible such as a separate lighting, not shown.

FIG. 2 shows a preferred installation of the sensor 10, here shown only in simplified form as a camera symbol, above a conveyor belt 26, with the sensor 10 here being configured as representative as a camera based code reader, but with the camera symbol not being intended to preclude either a barcode scanner or a comparable application example of a different sensor 10. A stationary application of the sensor 10 at a conveyor belt 26 is advantageous, but the invention is not restricted thereto. The conveyor belt 26 conveys objects 28, as indicated by the arrow 30, through the detection zone 12 of the sensor 10. The objects 28 bear code regions 32 on their outer surfaces which are detected and read by the sensor 10. These code regions 32 can only be recognized by the sensor 10 when they are affixed to the upper side or at least in a manner visible from above. Differing from the representation in FIG. 2, a plurality of sensors 10 can therefore be installed from different directions for reading a code 34 affixed, for instance, at the side or at the bottom. The arrangement of the plurality of sensors 10 to form a reading system mostly takes place as a reading tunnel in practice.

The sensor 10 detects object information as the primary goal of the application via the light receiver 18 and the evaluation of its received signals. In the example of a code reader, this is primarily the code content; in other cases, a completely different piece of object information can be sought such as color properties, brightness properties, geometry properties, positional properties, or other optically detectable properties. In addition, a measurement variable is determined from the received signal that only exceptionally corresponds to the object information and that in most cases is an auxiliary value such as a contrast, a mean gray value, the module size or pixel size of a code 32, or whether the code 32 could be read (Good read/No read). In addition, an object distance is determined by the distance sensor 24 for the respective object 28 whose object information is detected.

This is repeated over a selectable time period or a selectable plurality of detected objects 28 is repeated and a recognition is made by a statistical evaluation whether the sensor 10 can be optimized by a change of its settings or of its alignment. The recognition of a deterioration and a remedy o the cause such as a readjustment, a cleaning, or in extreme cases a unit replacement is in this connection also understood as an optimization. The statistical detection, the evaluation, and the conclusions drawn therefrom for an optimization will now be explained for embodiments.

FIG. 3 shows a schematic representation of objects 28a-c at different distances from the sensor 10. The reception optics 16 is set to the sharp detection of an object 28b at a middle distance in the upper part of FIG. 3; to the sharp detection of an object 28a at a short distance in the lower part. The depth of field ranges 36 are indicated via the respective mutual spacing of the lines shown therefor. Instead of the depth of field range 36 of the reception optics 16, the representation can equally be understood as the depth of field range 36 of a transmission optics, for instance as a size of the transmitted light sport in the case of a barcode reader.

The measurement variable observed by way of example here is the binary evaluation of success GR (Good read) that adopts the value one exactly when a code 32 can be read. This evaluation of success is equally also conventionally detected as its counterpart no read, but always only for a specific object 28. Only the reading rate has previously been detected over a plurality of objects 28, that is that a specific percentage of codes 32 could be read, which admittedly describes the performance capability well, but does not permit any error analysis.

In the example of FIG. 3, a conditional probability $p(GR|d)$ is now determined that indicates the probability with which a good read results at a respective specific distance d. To detect this conditional probability, the code 32 is respectively read on a detection of an object 28 and the associated GR is associated with the distance measured for this object 28. A new data point is thus created with every further object 28 and a distribution is formed from the gradually detected plurality of data points which estimates the sought conditional probability.

GR actually depends on a plurality of conditions. In addition to the shown depth of field 36 that above all plays a role with fixed focus devices since an autofocus individually adapts the depth of field to each object 28, they include a non-adapted illumination with an overexposure and an underexposure, a pixel size of the detected code 32 dependent on the distance and also a large number of conditions that cannot be influenced by the sensor 10 such as the code quality, the alignment of the code 32, and the planarity of the ground, possible damage or concealing, in particular due to a shiny film.

It is nevertheless assumed for reasons of simplification for the example of FIG. 3 that GR depends solely on the depth of field. Only three objects 28a-b are shown at the distances A, B, and C there, with the intermediate values naturally also being able to be adopted in practice. If, as in the upper part of FIG. 3, an object 28b is in focus, the conditional probability for its distance d=B amounts to $p(GR|B=1$ since GR should for reasons of simplification only be dependent on the depth of field. At the other distances, A, C, the probability drops to the randomly selected value $p(GR|A)=p(GR|C)=0.5$. If an equal distribution is roughly assumed for the distances of the objects 28a-c, the depth of field range 36 is a good selection here.

The conditional probability now amounts to $p(GR|A)=1$ for the near object 28a at the distance A in the lower part of FIG. 3. The middle object 28b at the distance B is only a little out of focus with $p(GR|B)=0.5$; the far object 28c at the distance C, however, is already considerably out of focus with $p(GR|C)=0.25$. There is consequently optimization potential here.

FIG. 4 generalizes the example of FIG. 3 and shows a distribution 38 of the conditional probability $p(GR)|d)$ over the distance that is assumed as a Gaussian distribution purely by way of example. A further distribution 40 of the distances of the objects 28 themselves is formed as the comparison value. On an installation of the sensor 10 as in FIG. 2 from above, the distances of the objects 28 simultaneously apply to their heights that are easily calculated by difference formation using the installation height of the sensor 10. The further distribution 40 is also assumed as a Gaussian distribution by way of example. The product 42 of the two distributions 38, 40 is also drawn as a possible evaluation of their coincidence.

As can be easily recognized, the sensor 10 is not optimized in this example. For this purpose, the two distributions 38, 40 would have to exactly overlap in the ideal case so that the best performance capability is achieved for the most frequently occurring cases. The sensor 10 can signal the optimization potential or, where accessible, even change its settings to utilize it to the full. For example, an iterative optimization is carried out using the product 42 or a maximum or a focus of the distributions 38, 40 is determined and brought into agreement.

In the specific example, the measurement variable is the binary evaluation of success GR or its conditional probability $p(GR|d)$ and the parameter of the depth of field range 36 to be changed and thus the focal position of the reception optics 16 or, alternatively, of a transmission optics. The conclusion the evaluation unit 20 draws from the distributions 38, 40 is a desired distribution of the focal position by a specific distance. This displacement is indicated for a fixed focus device. It is also possible that the sensor 10 can translate the conversion of a displacement $\Delta d$ of the focal position into a specific actuation instruction such as "0.2 revolutions to the left". This depends on the lens model and optionally on further models such as the exposure/distance model and on the adjustment mechanism of the reception optics 26 and is therefore preferably stored as a table.

An optimization of the focus setting is recognized and proposed in this manner. There are a large number of reasons why there is a need for optimization, either an insufficient adjustment on the setting up, a change of the objects 28 that now have a different distance distribution, a sudden change due to an incorrect behavior of employees, or environmental fluctuations such as seasonable temperature differences and damage to or aging of sensor components.

The recognition of an optimization requirement from additionally measured object distances and an association of a measurement variable with these object distances has previously been described very specifically with reference to the measurement variable GR or to its conditional probability p(GR|d) and to an adaptation of the focal position. The statistical evaluation using distance-dependent distributions, in particular as in FIG. 4, is, however, very much more general and variable. On the one hand, the focal position can also be evaluated by different measurement variables than an evaluation of success, for instance via a measure of contrast K that is observed directly or as conditional probabilities whether it remains in a specified value range [$K_{soil}$−Tolerance, $K_{soil}$+Tolerance]. Not only the measurement variable is changeable, but also the possible change for the sensor 10 that was previously the focal position or, in a direct generalization, a maladjustment of the optics or of the total sensor 10.

FIG. 5 illustrates in a representation similar to FIG. 3 a further embodiment that looks at an intensity evaluation. In a similar manner to the case of a fixed focus, a statistical optimization is above all helpful when the sensor 10 is not able to adapt its illumination parameters highly dynamically to the measured distance information for the currently detected object 28. A mean gray value GW is used as the specific measurement variable here. The intensity effectively detected by the sensor 10 depends on a large number of factors such as the illumination, the remission capability of the objects 28, their distance, an amplification factor in the reception path, or the exposure time. It is sensible to adapt those parameters such as illumination current, gain, and exposure time on which the sensor 10 has an influence to the actually occurring object distances so that the intensity for good decoding results remains as constant as possible and at least the underexposure or overexposure is minimized.

As in the upper part of FIG. 5, a respective conditional probability p((GW|d) remains in the desired range can be determined that GW. FIG. 6 shows, in a similar manner to FIG. 4, a corresponding generalized distribution 38 of p(GW|d) over the distance, together with a distribution 40 of the distances of the objects 28 themselves and the product 42 of both distributions 38, 40. There is optimization potential by a higher intensity, either by a greater illumination of the detection zone 12, a higher amplification factor, or a longer exposure time. The right degree can again be localized, for example, by iterative optimization or determining the centers or focii of the distributions 38, 40, in particular while including the product 42.

The measure of intensity can also be looked at itself instead of a conditional probability. This is shown in the lower part of FIG. 5. With a near object 28a, GW by way of example is equal to 355, which corresponds to the extreme case of complete glare with an 8-bit value range. For a middle object 28b, GW here is equal to 210; for a far objet 28c GW is equal to 160. As can be recognized from the conditional probabilities p(GW) in the upper part of FIG. 5, GW=210 is in the desired range of the measure of intensity, while GW=255 is considered as overexposed and GW=160 as underexposed. The exemplary values p(GW|A)=p(GW|C)=0 and p(GW|B)=1 result from this.

FIG. 7 shows the associated distribution 38 of the gray values over the distance. An overexposure will always occur at very close distances, the distribution 38 can therefore not be brought to coincide with the distribution 40 of the object distances, but very much into a best possible coincidence, preferably with reference to the product 42. Ideal illumination parameters in sensors 10 or in application situations that do not enable any highly dynamic illumination adaptation can therefore be obtained both from the measure of intensity GW itself and from the associated conditional probability p(GW|d).

The ideal illumination parameters for an application that does not permit any dynamic changes can now be determined in the two examples. Wear and contamination phenomena of the illumination, of the light receiver 18, of the reception optics 16, and the like can also be compensated in this manner.

FIG. 8 illustrates a further embodiment. It is assumed here that objects 28 having an equal object distance, in particular the same height, are actually objects of the same kind. Objects 28 of the same kind that bear the same code 32 represent a particularly illustrative example. In FIG. 8, the sensor 10 first detects three small objects 28 that are the same as each other and then three objects 28 that are of the same higher height with respect to one another, with the order not playing any role due to the statistical processing and with the objects 28 equally being able to occur in a mixed up order. The objects 28 each having the same height also bear a code 32 of the same code size, thus module size, and the same code type, and where possible the same or at least similar code position and code alignment.

Analog to the procedure explained up to this point, a distribution of the conditional probability is formed of the distance at which specific code properties are present. It is now conceivable, on the one hand, to adapt the sensor 10 in general as much as possible to these code properties, in the same manner as previously for optics properties and illumination properties. It is, however, also possible to read the probable code properties from the distribution with respect to the measured distance of the currently detected objects 28. This is at the same time a reversal of the previous procedure in that the already formed distribution is used for a prediction with reference to a single measured object distance. In the simple example of FIG. 8, the distribution adopts values not equal to zero only for a few discrete distances, two here, so that it is effectively a case by case distinction.

An assumption of the code properties of the code 23 just to be read can at least be seen from the distribution since the distribution includes the information that an object 28 having a specific height probably has a code 32 having the code properties also previously occurring most frequently. This information permits a substantially faster decoding for the software decoder that first seeks the code 32 in a specific region of interest (ROI) and attempts a reading attempt for a specific code type having a specific module size. If this fails, further reading attempts can follow without these assumptions.

In a further embodiment without a separate illustration, distributions of the object distances are formed from different time intervals and are compared with one another. If a significant difference occurs on this time comparison, the alignment of the sensor 10 has possibly been changed by a blow, for instance, and the sensor 10 indicates that the alignment should be checked. Subsequently, as described above with respect to FIG. 3, the adjustment of the optics can be improved.

In a further embodiment, the sensor 10 outputs feedback on expected object properties, in particular a code quality. The contrast or an evaluation of success of the reading procedure are particularly suitable as measurement variables for this purpose. In a similar manner to the example of FIG. 8, a contrast to be expected from statistics or a reading success can be determined from the already present distribution for the just detected object 28 with reference to its object distance. In addition, the actual contrast is determined or a reading procedure is carried out and evaluated. The expectation and the measurement are then compared with one another. In simplified terms, the idea here is that if previously most codes or all the codes 32 could be read at this distance and now only not the currently detected code 32, it is the code 32 that must be at fault. The association of a reading error with the sensor 10 or with the code 32 can be further improved by an observation of the reliability of the expectation with a typical measure such as the standard deviation.

More specifically, in particular two cases can occur. In the first case, the code 32 is not sufficiently printed and has too little contrast. Since all the codes 32 are normally read at this distance, it is probable that the code 32 itself is the reason why the code content could not be read. If in addition the contrast differs significantly from its normal value, a lack of contrast and thus a poor print quality is probably the real reason. In the second case, a reading error (No read) likewise occurs even though codes 32 can normally be read at this distance. At the same time, however, the contrast is in the expected range and it is therefore probable that the code 32 is damaged.

Finally, the measurement variables described by way of example and the sensor settings to be optimized should be compiled again in a clear manner.

| Measurement variable | Change/Sensor setting/Feedback |
|---|---|
| Contrast, Reading rate, Good read, No read, Image sharpness | Focal position; Predictive maintenance even before signs of failure whether the reception optics or other optical elements have changed over time. |
| Middle gray value, maximum gray value, minimal gray value, other gray values; General measure of intensity | Setting for the ideal illumination with time-critical applications that do not permit dynamics; Predictive maintenance whether the illumination intensity has decreased over time |
| Code size, code type, code position, module size | Information for the decoder for faster decoding |
| Object distance, height distribution of the objects | Installation change of the camera with a significant change over time (such as a blow against the sensor) |
| Contrast, Reading rate, Good read, No read, Image sharpness | Quality of the code with error analysis |

This compilation is, however, not exclusive. Despite the exemplary observations, further measurement variables that an optoelectronic sensor 10 can detect, optimizations of possible settings of a sensor 10, and also combinations of measurement variables and optimizations beyond embodiments are conceivable. In addition, the invention is not restricted to specific probability distributions even though an equal distribution or a Gaussian distribution was used as an example at times.

The invention claimed is:

1. An optoelectronic sensor for a repeated detection of objects at different object distances, the optoelectronic sensor comprising:
   a light receiver for generating a received signal from received light;
   an evaluation unit for generating object information from the received signal; and
   a distance sensor for determining an object distance from a respective object of a plurality of objects,
   wherein the evaluation unit:
   acquires a measurement variable from the received signal with respect to one of the objects of the plurality of objects,
   associates the measurement variable with the object distance measured for the respective one of the objects of the plurality of objects,
   after detection of at least a portion of the plurality of objects and respective association of the measurement variable with the object distance for each of the objects of the at least a portion of the plurality of objects repeated over a selected time period or a selected number of detections, such that sufficient statistics are available to form a first distribution of the measurement variable via the object distance for the objects of the at least a portion of the plurality of objects, forming the first distribution of the measurement variable, wherein the first distribution represents a distribution of the measurement variables respectively associated with the plurality of objects, and
   statistically evaluating the first distribution to determine whether there is an optimization potential or a service requirement.

2. The optoelectronic sensor in accordance with claim 1, wherein the optoelectronic sensor comprises a camera.

3. The optoelectronic sensor in accordance with claim 1, wherein the evaluation unit is configured to form a second distribution of the object distances.

4. The optoelectronic sensor in accordance with claim 3, wherein the evaluation unit forms a distribution of the object distances as the first distribution and forms a distribution of the object distances in another time section as the second distribution.

5. The optoelectronic sensor in accordance with claim 3, wherein the evaluation unit compares the first distribution and the second distribution and afterward carries out or proposes a change to the optoelectronic sensor to improve a coincidence of the distributions.

6. The optoelectronic sensor in accordance with claim 5, wherein the change is an optical readjustment.

7. The optoelectronic sensor in accordance with claim 6, wherein the change is an optical readjustment of a focal position.

8. The optoelectronic sensor in accordance with claim 5, wherein the change is an adaptation of illumination intensity.

9. The optoelectronic sensor in accordance with claim 1, wherein the evaluation unit forms a probability distribution as the first distribution by determining the measurement variable as a respective probability that a value derived from the received signal is in a fixed region.

10. The optoelectronic sensor in accordance with claim 1, wherein the evaluation unit associates the measurement variable from the first distribution at the object distance as an expected measurement variable with another one of the objects with reference to the object distance measured for the another one of the objects.

11. The optoelectronic sensor in accordance with claim 10,
wherein the evaluation unit compares the expected measurement variable with a measurement variable actually determined for the another one of the objects from the received signal associated therewith.

12. The optoelectronic sensor in accordance with claim 1, wherein the measurement variable is a measure of contrast.

13. The optoelectronic sensor in accordance with claim 1, wherein the measurement variable is a measure of intensity.

14. The optoelectronic sensor in accordance with claim 1, wherein the optoelectronic sensor is a code reader whose evaluation unit reads a piece of code information of an optical code from the received signal.

15. The optoelectronic sensor in accordance with claim 14,
wherein the measurement variable is an evaluation of success for the reading of a code.

16. The optoelectronic sensor in accordance with claim 14,
wherein the measurement variable has a code property.

17. A method for the repeated optical detection of objects at different object distances, comprising the steps of
generating a received signal from received light;
evaluating the received signal to acquire a piece of object information;
determining an object distance from a respective object of a plurality of objects;
acquiring a measurement variable from the received signal with respect to one of the objects of the plurality of objects, wherein the measurement variable is associated with the object distance measured for the one of the objects of the plurality of objects; after detection of at least a portion of the plurality of objects and respective association of the measurement variable with the object distance for each of the objects of the at least a portion of the plurality of objects repeated over a selected time period or a selected number of detections, such that sufficient statistics are available to form a first distribution of the measurement variable via the object distance for the objects of the at least a portion of the plurality of objects, forming the first distribution of the measurement variable, wherein the first distribution represents a distribution of the measurement variables respectively associated with the plurality of objects; and
statistically evaluating the first distribution to determine whether there is an optimization potential or a service requirement.

* * * * *